United States Patent [19]

Gradle

[11] Patent Number: 4,651,824

[45] Date of Patent: * Mar. 24, 1987

[54] CONTROLLED PLACEMENT OF UNDERGROUND FLUIDS

[76] Inventor: Donovan B. Gradle, 17 Seasons Ct., Madera, Calif. 93637

[*] Notice: The portion of the term of this patent subsequent to Jan. 20, 2004 has been disclaimed.

[21] Appl. No.: 784,113

[22] Filed: Oct. 4, 1985

Related U.S. Application Data

[63] Continuation-in-part of Ser. No. 740,986, Jun. 4, 1985.

[51] Int. Cl.$^4$ .................. E21B 33/128; E21B 43/116; E21B 43/119; E21B 43/30
[52] U.S. Cl. ..................... 166/245; 166/55.1; 166/191; 166/254; 166/281; 166/292; 166/297; 210/170; 405/129; 405/270
[58] Field of Search ............ 166/55, 55.1, 55.2, 166/191, 281, 245, 254, 285, 292, 293, 294, 295, 297, 305.1; 299/7, 8; 175/4.51, 4.52, 4.57, 66; 405/128, 129, 267, 270; 210/170

[56] References Cited

U.S. PATENT DOCUMENTS

| | | | |
|---|---|---|---|
| 2,161,800 | 6/1939 | Cross | 299/7 X |
| 3,118,501 | 1/1964 | Kenley | 175/4.52 |
| 3,161,235 | 12/1964 | Carr | 166/281 |
| 3,361,204 | 1/1968 | Howard et al. | 175/4.51 X |
| 3,407,605 | 10/1968 | Coffer et al. | 405/267 X |
| 3,419,070 | 12/1968 | Ernst | 166/281 X |
| 3,761,132 | 9/1973 | Grable | 299/7 |
| 3,790,213 | 2/1974 | Grable | 299/8 |
| 3,815,681 | 6/1974 | Richardson | 166/281 |
| 3,855,807 | 12/1974 | Grable | |
| 3,856,355 | 12/1974 | Grable | 299/8 |
| 3,917,326 | 11/1975 | Grable | 299/8 |
| 4,255,067 | 3/1981 | Wright | 405/258 X |
| 4,273,475 | 6/1981 | Fuller | 405/267 X |
| 4,288,174 | 9/1981 | Laws | 405/129 X |
| 4,305,463 | 12/1981 | Zakiewicz | 166/299 X |
| 4,311,340 | 1/1982 | Lyons et al. | 405/267 |
| 4,399,866 | 8/1983 | Dearth | 166/294 X |
| 4,430,021 | 2/1984 | Wagner et al. | 405/270 X |
| 4,436,154 | 3/1984 | Vann et al. | 166/281 |
| 4,439,062 | 3/1984 | Kingsbury | 405/24 |
| 4,497,519 | 2/1985 | Grable | 299/8 |
| 4,534,423 | 8/1985 | Regalbuto | 166/297 X |
| 4,541,927 | 9/1985 | Breidenbaugh | 210/170 X |

*Primary Examiner*—George A. Suchfield
*Attorney, Agent, or Firm*—William W. Haefliger

[57] ABSTRACT

A method of controlling subterranean placement of underground fluids, such as liquids, includes (a) positioning a tubing joint longitudinally in a borehole in the earth to locate the split and gun at selected depth,
(b) rotating the tubing to orient the split azimuthally so that a gun in the tubing is aimed in a desired direction laterally,
(c) discharging the gun to cause its projectile to travel in said desired direction in the formation, thereby opening up a lateral shot hole in the formation,
(d) and pumping fluid under pressure down the borehole to discharge into the shot hole into a selected zone laterally spaced from the tubing.

29 Claims, 4 Drawing Figures

CONTROLLED PLACEMENT OF UNDERGROUND FLUIDS

BACKGROUND OF THE INVENTION

This application is a continuation-in-part of Ser. No. 740,986, filed June 4, 1985. This invention relates generally to control of contaminants of water, and more particularly to such control as applied to contaminants in reservoirs or ponds, thereby to prevent, reduce or control contamination of the underground formation. The risk of contamaination of fresh underground water of aqifers is thereby reduced or substantially eliminated.

Need for such control of contamination is known, Federal Government agencies, such as the EPA, providing programs addressed to alleviating such contamination. Recently the problem of selenium contamination of water drainage from the Kesterson Reservoir in the San Joaquin Valley has been addressed by the U.S. Department of the Interior, and the California State Water Resources Board. Proposals to alleviate such contamination have resulted in clean-up programs estimated to cost hundreds of millions of dollars. Clearly, there is need for method and means to alleviate such problem, at much lower cost.

Also, there is a need for accurate control of placement of underground fluids, as for example barrier liquids.

SUMMARY OF THE INVENTION

It is a major object of the invention to meet the above needs through method and means that do not require removal and re-siting of vast quantities of earth. Basically, the method of the invention contemplates controlling the flow of downwardly seeping and laterally seeping contamination by:

(a) determining the locus of flow of the contaminants in a porous underground formation, and (b) injecting into the formation a substance that creates a barrier in the formation, to such flow, to thereby block said flow.

The above first step is typically carried out by testing the composition of the formation in a region or regions toward which contaminants flow is suspected; and test holes are typically drilled proximate the reservoir or pond to enable such testing.

The above second, or injection, step typically includes drilling at least one hole in the formation, said (b) step injection being carried out via said hole or holes. To this end, the injection step may also include setting casing in the drilled hole, cementing the casing in place, said (b) step injecting including pumping said substance in flowable form and under pressure downwardly in th casing to a depth at which it penetrates the underground formation.

Further, the injected substance typically includes an expansible clay-like material or equivalent thereof, that enters and tends to plug flow passages in the formation.

Further steps of the invention include maintaining a settling pond or reservoir, and periodically removing the said settled solids from the pond bottom, and storing the removed solids, whereby the concentration of contaminates draining from the pond is correspondingly reduced. Such removed solids may be processed to extract mineral or salt concentrates, including selenium, for disposal or use in industry. Dredges may be operated in the reservoir or pond to remove the deposit layer at the bottom of the pond.

In addition, the invention is directed to a method for controlling placement of underground fluids, and employing a tubing joint having a split in the side thereof, and a gun positioned inside the tubing with a projectile in the gun to be discharged through the split in the tubing, the steps that include:

(a) positioning the tubing joint longitudinally in a borehole in the earth to locate the split and gun at selected depth, (b) rotating the tubing to orient the split azimuthally so that the gun is aimed in a desired direction, laterally, (c) discharging the gun to cause the projectile to travel in said desired direction in the formation, thereby opening up a lateral shot hole in the formation, (d) and pumping fluid under pressure down the borehole to discharge into the shot hole into a selected zone laterally spaced from the tubing.

Casing may be employed in the well and pressurized fluid pumped down the casing to discharge into lateral shot holes, as will be seen, Very accurate control of barrier liquid placement can thereby be achieved.

These and other objects and advantages of the invention, as well as the details of an illustrative embodiment, will be more fully understood from the following specification and drawings in which:

DRAWING DESCRIPTION

DETAILED DESCRIPTION

Figure 1:
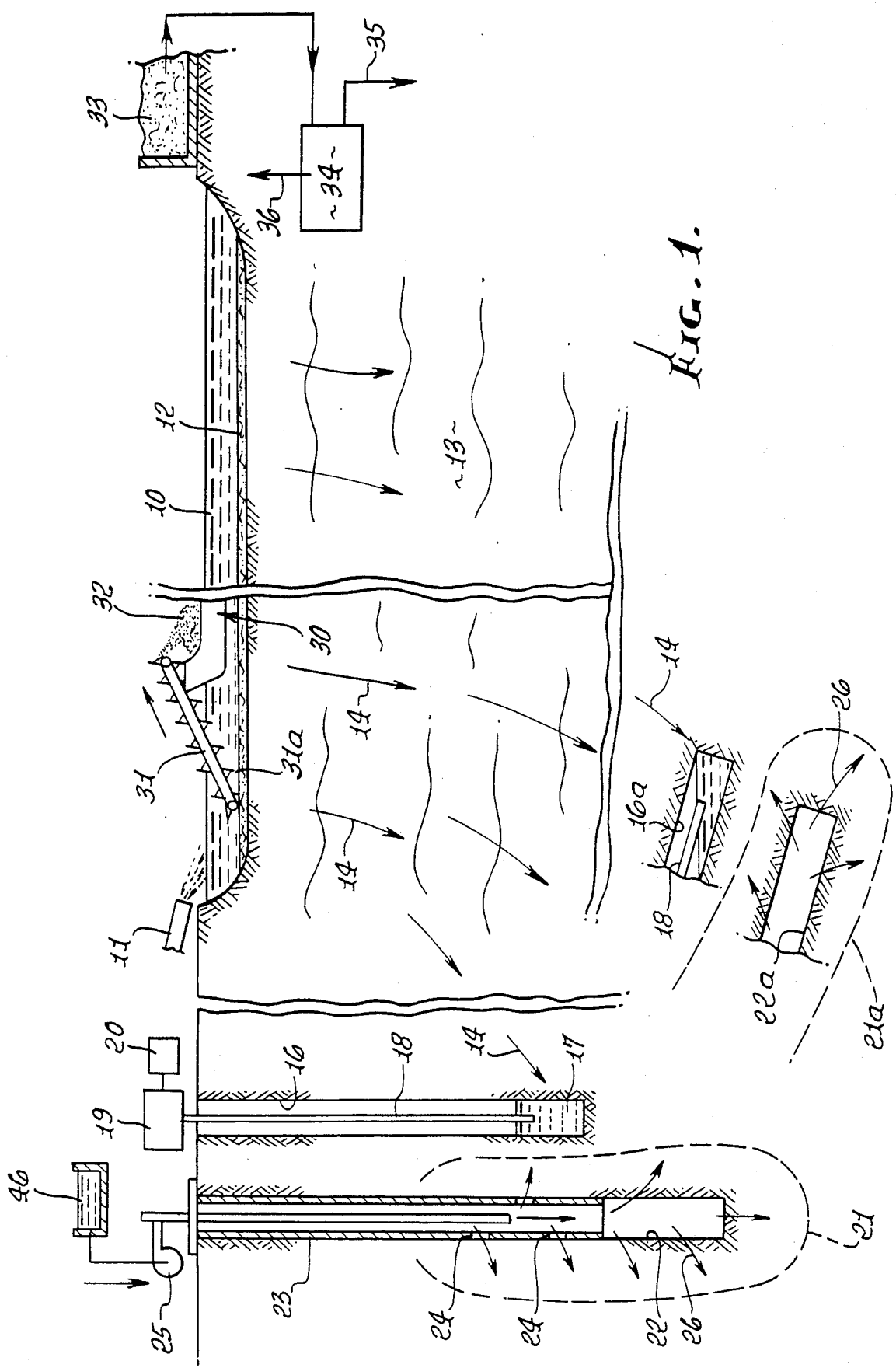
FIG. 1 is an elevation, in section, showing a settling pond from which contaminated water slowly drains, and associated apparatus employed in accordance with the invention.

In the drawings, a settling pond or reservoir is indicated at 10, and typically may have a water depth of up to several feet, 2 to 30 for example. The area or size of the pond may vary within wide limits, i.e. several hundred square feet to square miles. Water may be fed to thepond as indicated at 11, and may for example consist of drainage water, from irrigated areas, silt carrying water from streams or rivers, flood run-off, etc. Such water may, for example carry or contain contaminants such as selenium, arsenic, boron, cadmium, chromium, copper, mercury, molybdenum, nickel, silver ad zinc, or salts thereof, in parts per million in excess of acceptable limits. During settling, the solids in the pond or reservoir water, including such contaminants, tend to settle, and form a bottom layer or layers, indicated at 12. Over time, water and contaminants therein may seep or drain downwardly in the formation 13, as indicated by the arrows 14, and it is desirable that lateral travel of the drainage be contained. It is also desirable that the concentration of contaminants in the draining water be minimized.

In accordance with the invention, the locus or loci of flow of the draining contaminants, in the porous underground formation is first determined. Thereafter, or in conjunction with such determination, the invention contemplates the injection into the underground formation of a substance or substances that create a barrier in the formation to such flow, to block or slow the lateral or downward spreading of contaminant seepage, whereby the purity of fresh ground water in the vicinity of the reservoir is not impaired, i.e. is preserved, or the amount of fresh water contamination is reduced. In this regard, need for highly expensive dig-up and removal of the formation below or near the reservoir is thereby avoided.

Figure 2:
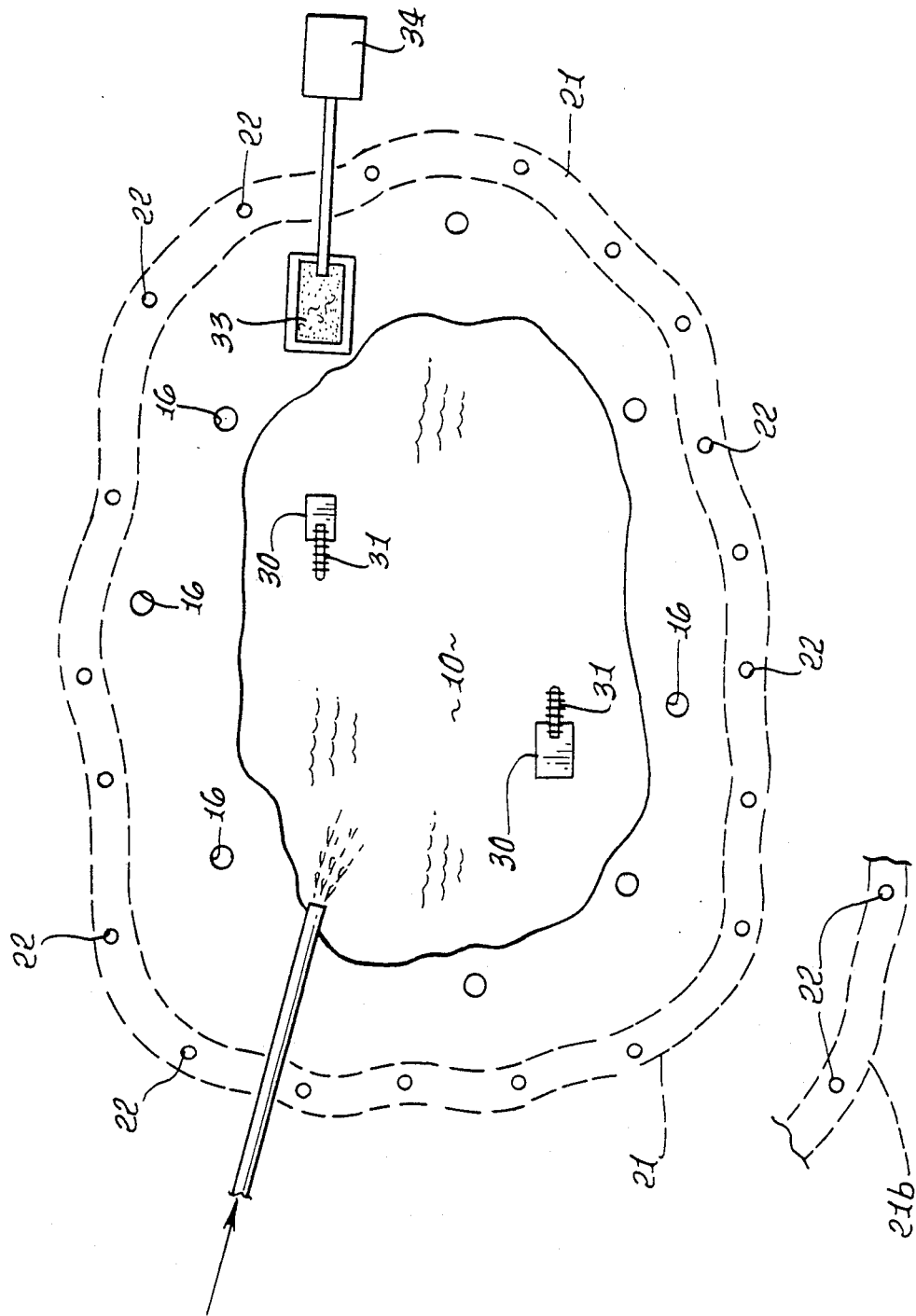
FIG. 2 is a plan view showing the FIG. 1 pond, test wells, and barrier injection wells.

More specifically, FIGS. 1 and 2 show the provision of test wells 16 drilled downwardly into the formation in regions about the reservoir, and typically laterally thereof; see also test wells 16a drilled at slant depth below the reservoir. Water seeping into the test wells, as seen at 17, is periodically tested to determine contamination levels. See for example piping 18 extending in the test wells, and via which water is withdrawn via pump 19, and delivered testing instrumentation 20, the latter being conventional. If the contamination level is rising or is otherwise considered dangerous, or of future concern, the need for a barrier to block seepage flow in the formation at the test locality is considered established. The depth of the test wells 16 may vary, examples being 13 to 100 feet.

To create the barrier, or barriers indicated for example by broken lines 21 and 21a, one or more injection wells are drilled, as indicated at 22, as for example laterally outwardly from the test wells. FIG. 1 also shows a slant injection well 22a below the level of test well 16a, and below the reservoir. Such injection wells 22 and 22a may then be partly or completely cased at 23, and cemented, as is done in oil and gas well completion, in order to withstand injection pressures i.e. not damage the well formation. Casing perforation, by known techniques may also be carried out. See perforations 4.

Thereafter, a subterranean barrier creating substance is pumped down the wells 22, as via a pump 25. A source of such flowable aqueous liquid slurry, or mud, is indicated at 46, and may consist of drilling mud as is used in the oil and gas drilling industry. The mud typically contains particles of clay that are characterized as expansible after they forcibly enter (see arrows 26) subterranean passages or porosity, under pressure, to plug same, creating the barrier or barriers 21 to flow of the reservoir seepage. Such clays ae generally referred to as "Bentonites", which are colloidal clays (aluminum and magnesium silicates) containing montmorillonite. They are of varying compositions and are obtainable from natural deposits in many countries, including Italy, Spain, US.S.R., Canada and the United States (principally Wyoming, Mississippi and Texas). Although some bentonites, principally those which may be characterized as calcium (or magnesium) bentonites, have low or neglible swelling capacities, these may be converted or "activated" so as to increase such swelling capacity. Such conversion may be effected by appropriate treatment with alkaline material, preferably aqueous sodium carbonate solution, in a manner known in the art, to insert sodium (or potassium) into the clay structure.

Accordingly, the created barriers 21 and 21a obstruct or contain the seepage from the reservoir, FIG. 2, showing a barrier extending as a ring around the formation below the reservoir 10. Such barrier or barriers may have any desired depth, as controlled by depth of the wells 22—example being 10 to 150 feet. A second and outer barrier is also shown at 21b in FIG. 2, and may extend around barrier 21.

Th risk of contamination (as by selenium or other metals or salts) is further reduced, by reducing the concentration of contaminants in the water seeping from the reservoir. To this end, the deposit or layer 12 of concentrated minerals and salts thereof is periodically removed, as for example by operating a floating, self propelled dredge or dredges in the pond or reservoir. See for example dredges 30 with endless conveyors 31 having buckets 31a that are traveled downwardly to progressively scoop up layer 12, as the dredge is moved, or moves, about the pond. The removed concentrate 32 is shown as temporarily stored at 33. It may be subsequently processed, as at 34, to separate and recover the mineral concentrates at 35, the lighter fractions such as silicates being removed at 36 for return to the land. Cyclone or other separation means may be employed.

A stable reservoir system may thus be established, with water evaporating from the reservoir; settled contaminant concentration being removed; and any seepage from the reservoir being located and blocked or contained.

The cost of drilling wells, injecting the barrier forming mud, and dredging the controllable size reservoir is very much less than the alternative of digging up the reservoir and disposing of the contaminated earth, for large size reservoirs.

A usable, legged, floatable hull dredge is disclosed in U.S. Pat. No. 3,855,807 to Grable, incorporated herein by reference.

Usable barrier mud densities (weights) can very from less than abut 100 pounds per cubic foot up to about 130 pounds per cubic foot, the latter higher weight mud for example incorporating barite or barites. Thus, such barrier muds can have densities substantially greater than that of the seeping water and as high as two times the density (64 pounds per cubic foot of water) to more effectively block water migration.. Bentonite muds as disclosed herein also have lubricity, enabling or facilitating penetration into water sands.

Figure 3:
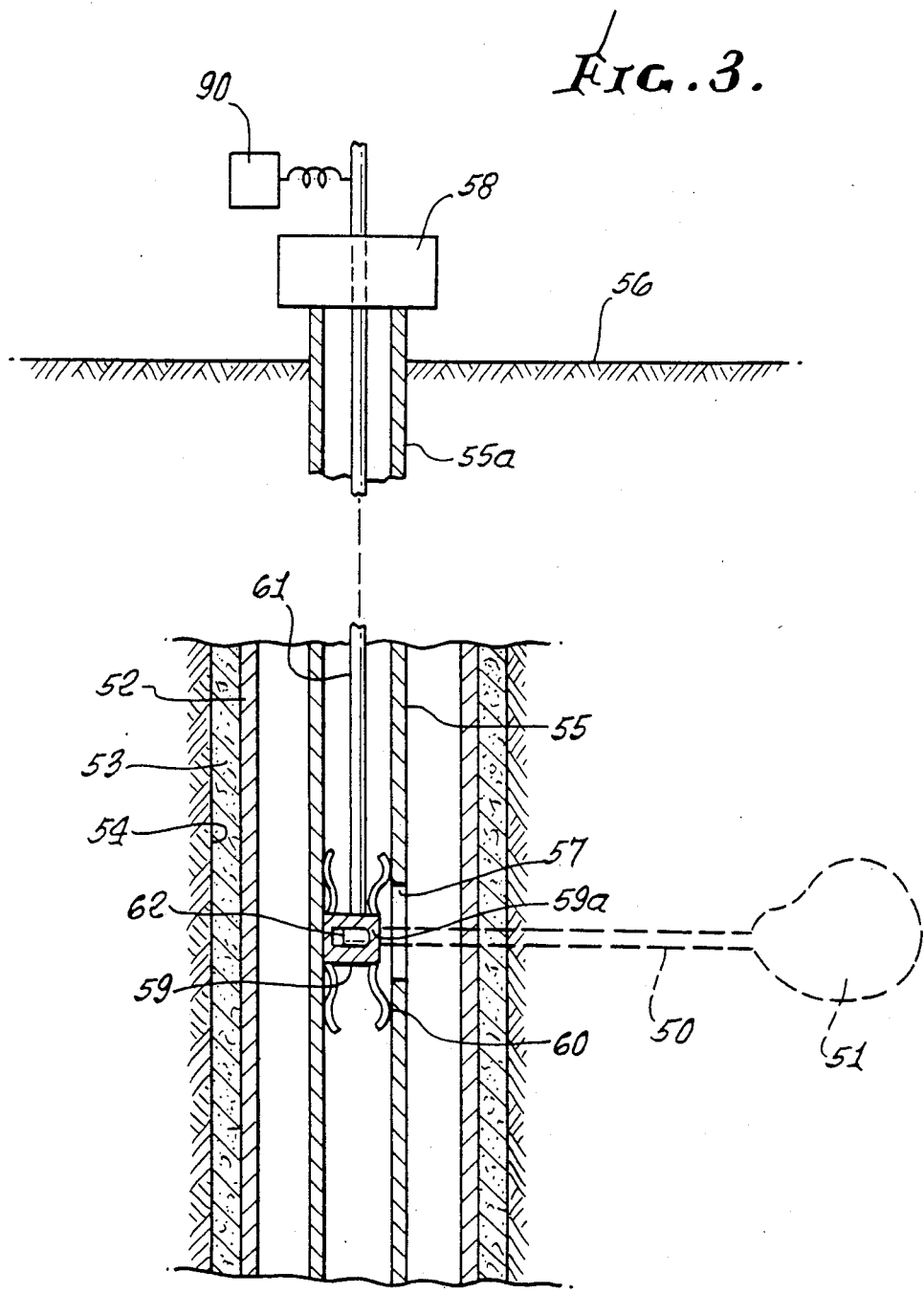
FIG. 3 is an elevation, in section, showing a means to provide a path for accurate placement of underground fluid.

Referring now to FIG. 3, a method and means is shown to provide a lateral path 50 for placement of underground fluid as in a target zone 51. The latter may, for example, serve as a barrier liquid zone to contain contaminant as described above. As shown, casing 52 is cemented at 53 in a borehole 54, whereby the casing cannot move. Thereafter, (or in the absence of the casing) a tubing joint 55 is positioned longitudinally in the borehole, or in the casing, as on a string 55a of such casing extending to the surface 56. The joint 55 contains a split or side opening 57, and the tubing may be rotated in the hole, as by means 58 at the surface, so as to orient the split 57 azimuthally. A perforating gun 59 is suspended in the tubing so as to rotate therewith, the gun barrel 59a aimed laterally at the split, whereby the gun is also aimed in the desired direction as the tubing is rotated. Merely for purposes of illustration, belly springs 60 carried by the gun frictionally engage the tubing bore, and a vertically adjustable cable 61 suspends the gun.

When the gun is thus aimed in the target zone direction, it is discharged as via an electrical signal transmitted at 90 via the cable. This causes the projectile (or gun shot) 62 to forcibly travel toward target zone 51, opening up a lateral shot hole 50 in the formation. Several of such holes may be produced in the formation, as at different elevations, and extending in desired azimuthal directions, to establish shot holes or paths leading to selected target areas, for injection of fluid to such areas, as for example barrier fluid, as described above. Two such holes appear at 50 and 150, in FIG. 4, leading to target zones 51 and 151, at different elevations.

Figure 4:
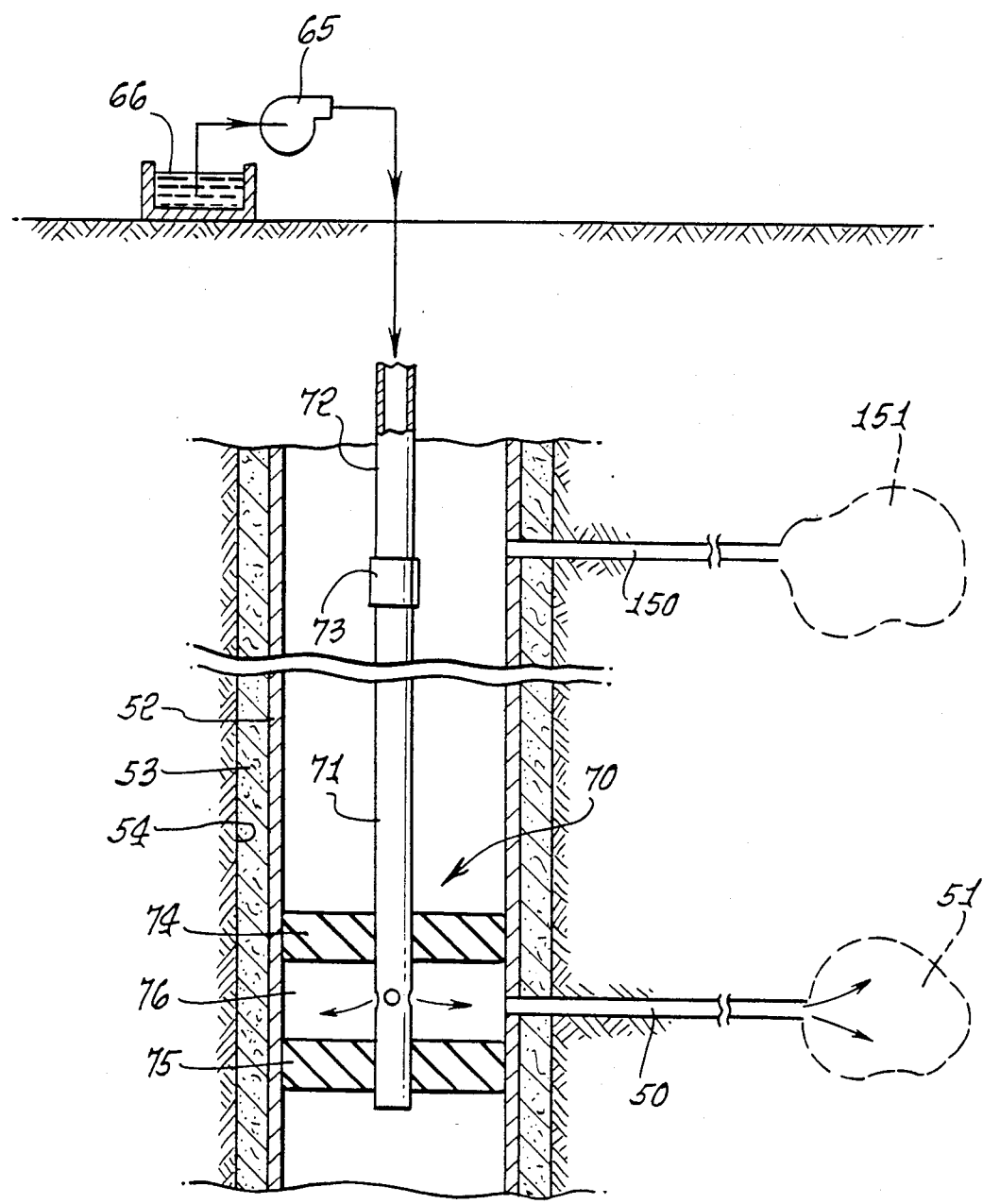
FIG. 4 is an elevation, in section, showing underground fluid placement, using the provided path.

Also, as shown in FIG. 4, a pump 65 is used for pumping fluid under pressure into the borehole, as via tubing 72, so that the fluid travels laterally into and via the shot holes into the selected target zones. Typically, the fluid is pumped at discharge pressures of between 7,000 psi, and at flow rates between 1,500 and 2,500 gallons per minute. The shot holes typically have diameters between ½ and 2 inches, and are most preferably about 1 inch in diameter. A source of said fluid is shown at 66.

A straddle tool 70 may be employed and includes a pipe 71 coupled to a tubing string 72 at 73. The tool includes upper and lower packers 74 and 75, and space 76 therebetween. The tool is vertically lowered or elevated, via string 72, until space 76 registers with a selected lateral shot hole, as at 50. Then barrier fluid is pumped down the string to fill space 76, and to enter and travel in shot hole 50 to target zone 51, filling the latter, which may be a porous formation. The tool is then elevated until space 76 registers, with shot hole 150, and fluid is again pumped down the string and travels via shot hole 150 to target zone 151. Thus, barrier fluid may be selectively placed, under pressure, into selected target zones, to contain contaminant fluid.

The tubing 55 and 55a, and gun 59, are typically retrieved at the surface prior to fluid pumping down the hole.

The shot holes will typically shatter and weaken the formation at some distance from the point of discharge; therefore, the discharge of fluids through the shot holes will encounter less resistance and will follow the path of the shot to the controlled target.

The surface pumping equipment will typically have 850 H.P. drive, capable of pumping 1,900 gal. per min. at 10,000 psi and the fluids discharge will be traveling at such speed that they can only go in a straight line for a long distance from the point of discharge.

For an example, casing is cemented in at 60 feet, a one inch shot hole is opened at 30 feet depth, and the pump starts forcing 1,900 gal. per min. down the casing. Seconds later there will be thousands of pounds of pressure on the casing and the fluid being dishcarged will be like a solid fluid ram driving everything out of its way until the flow fans out and looses its velocity. At that point the pumps are shut off to stop the flow from puddling. Seventy to eighty percent of the cemented-in-casing holding strength is typically below the level where the hydraulic forces will release through the oriented shot holes. The casing cementing procedure reduces the possibility of the casing turning under high pressures and also reduces the likelihood of breaking circulation around the casing as in a shorter string. This feature is of particular importance, for high pressure and large volumes of fluids are to be discharged through the oriented shot holes at a shallow depth.

This method of landing and cementing casing serves several purposes not known to be used in the industry:

First, oriented shot holes of many sizes and strengths can be placed in the casing to cause discharged fluids under high pressure to go on a predetermined line of direction to an objective.

Second, the oriented shot hole size and the pump pressure reading on surface discharge pump can be used to record the velocity and volume at the point of discharge.

Third, in unconsolidated ground a pressure of 5,000 psi can be held on the casing and an oriented shot of any size can be discharged through the casing at a predetermined target at such a velocity that it will penetrate most compacted ground.

Utilizing oriented shot fracturing holes, 75 to 80% hold down, cemented-in-casing, and high pressure, large volume surface pumping equipment, a liquid mud ring can accurately and economically be placed around, below and on top of any toxic waste configuration, regardless of depth and ground conditions.

The combination of these procedures permits the generation of powerful finger tip control of hydraulic forces capable of displacing any amount of underground over-burden desired in a matter of a few minutes with liquid mud.

I claim:

1. The method of controlling the subterranean flow contaminants in water draining from a pond or reservoir, the pond of reservoir also receiving inflow of contaminants, that includes
   (i) removing settled contaminants at the bottom of the pond or reservoir, and
   (ii) injecting into the subterranean formation a substance that creates a barrier in the formation to said subterranean flow, to thereby block said flow,
   (iii) said contaminat removal being carried out at a rate in relation to said inflow that contamination by escape of contaminants via subterranean flow, beyond the barrier, is substantially stablized,
   (iv) said (ii) step including employing a tubing joint having a split in the side thereof, and a gun positioned inside the tubing with a projectile in the gun to be discharged through the split in the tubing, and including the further steps:
      (a) positioning the tubing joint longitudinally in a borehole in the earth to locate the split and gun at selected depth,
      (b) rotating the tubing to orient the split azimuthally so that the gun is aimed in a desired direction, laterally,
      (c) discharging the gun to cause the projectile to travel in said desired direction in the formation, therby opening up a lateral shot hole in the formation,
      (d) and pumping said substance in the form of fluid under pressure down the borehole to discharge into the shot hole into a selected zone laterally spaced from the tubing.

2. The method of claim 1 including initially placing casing in the borehole, and said step(c) is carried out to cause the projectile to perforate the casing.

3. The method of claim 2 wherein said step (d) is carried out by pumping said fluid down the casing.

4. The method of claim 2 including cementing the casing in emplaced position in the borehole, and then carrying out said step (a) by lowering the tubing joint in the casing to located the split at selected depth.

5. The method of claim 1 that includes repeating said steps (a)–(d) at different borehole sites selected so that said fluid receiving zones are spaced apart at selected positions with respect to an underground target area.

6. The method of claim 5 wherein said selected target area is a contaminated area, and said fluid discharged into said zones is a barrier fluid which thereby forms a barrier to escape of contaminant from said area.

7. The method of claim 1 wherein the shot hole has a diameter between ½ inch and 2 inches, and is at a depth in the formation between 60 feet and 15 feet.

8. The method of claim 7 wherein the fluid is pumped at a discharge pressure of between 7,000 psi and 15,000 psi.

9. The method of claim 8 wherein the flow rate of fluid down the casing is between 1,500 and 2,500 gallons per minute.

10. The method of claim 1 wherein said (a), (b) and (c) steps are carried out to form multiple of said shot holes in the formation, at different elevations.

11. The method of claim 10 wherein said (d) step is carried out to pump fluid into each of said shot holes at said different elevations.

12. The method of claim 11 wherein fluid is pumped sequentially into said shot holes, so that full pressure is applied to fluid displaced into each shot hole.

13. The method of claim 12 including employing a straddle tool in the bore hole to straddle a selected shot hole, and pumping fluid to the straddle too.

14. The method of claim 13 including traveling the straddle tool between selected shot holes.

15. The method of claim 1 that also includes
(v) preliminarily determining the locus of said subterranean flow of contaminants in a porous underground formation.

16. The method of claim 15 wherein said (v) step is carried out by testing the composition of the formation in a region or regions toward which contaminant flow is suspected.

17. The method of claim 16 wherein said (a) step includes drilling at least one hole in the formation to said region or regions, and carrying out said testing via said hole or holes.

18. The method of claim 15 wherein said substance comprises an expansible clay-like material or equivalent thereof, that enters and tends to plug flow passages in the formation.

19. The method of claim 18 wherein said substance comprises bentonite, in aqueous slurry.

20. The method of claim 15 wherein said contaminates are selected from the group consisting of selenium, arsenic, boron, cadmium, chromium, copper, mercury, molybdenum, nickel, silver, zinc, and salts thereof.

21. The method of claim 1 including controllably flowing contaminated water into said pond, and allowing solids in said water to settle to the bottom of said pond.

22. The method of claim 21 wherein said (i) step includes periodically removing settled solids from the pond bottom, and storing the revoved solids, whereby the concentration of contaminants draining from the pond is correspondingly reduced.

23. The method of claim 22 including processing said solids to remove mineral concentrates.

24. The method of claim 23 wherein said concentrates include selenium and salts thereof.

25. The method of claim 22 wherein said periodic removal includes operating a dredge in the pond.

26. The method of controlling the subterranean flow of contaminants in water draining from a pond or reservoir, the pond or reservoir also receiving inflow of contaminants, that includes
(i) removing settled contaminants at the bottom of the pond or reservoir, and
(ii) injecting into the subterranean formation a substance that creates a barrier in the formation to said subterranean flow, to thereby block said flow,
(iii) said contaminant removal being carried out at a rate in relation to said inflow that contamination by escape of contaminants via subterranean flow, beyond the barrier, is substantially stabilized,
(iv) said (ii) step including
employing shot holes in the formation extending laterally from a bore hole into which said flowable substance is pumped, under pressure.

27. The method of claim 26 including setting casing in said hole, cementing the casing in place said (ii) step including pumping said substance in flowable form and under pressure downwardly in the casing to a depth at which it penetrates the underground formation, via said shot holes.

28. The method of controlling the subterranean flow of contaminants in water draining from a pond or reservoir, the pond or reservoir also receiving inflow of contaminants, that includes
(i) removing settled contaminants at the bottom of the pond or reservoir, and
(ii) injecting into the subterranean formation a fluid substance that creates a barrier in the formation to said subterranean flow, to thereby block said flow,
(iii) said contaminant removal being carried out at a rate in relation to said inflow that contamination by escape of contaminants via subterranean flow, beyond the carrier, is substantially stabilized,
(iv) said (ii) step including employing a tubing joint having a split in the side thereof, and a gun positioned inside the tubing with a projectile in the gun to be discharged through the split in the tubing, and including the further steps:
(a) positioning the tubing joint longitudinally in a borehole in the earth to locate the split and gun at selected depth,
(b) rotating the tubing to orient the split azimuthally so that the gun is aimed in a desired direction, laterally,
(c) discharging the gun to cause the projectile to travel in said desired direction in the formation, thereby opening up a lateral shot hole in the formation,
(d) and pumping fluid under pressure between 7,000 psi and 15,000 psi down the borehole to discharge into the shot hole into a selected zone laterally spaced from the tubing,
(e) repeating said steps (a)–(d) at different borehole sites selected about said pond so that said fluid receiving zones are spaced apart at selected positions about an underground target area generally beneath said pond, said fluid discharged into said zones being a barrier fluid which thereby forms a barrier to escape of contaminant from said target area,
(f) controllably flowing contaminated water into said pond, and allowing solids in said water to settle to the bottom of said pond,
(g) and periodically removing the said settled solids from the pond bottom, and storing the removed solids whereby the concentration of contaminants draining from the pond toward said barrier is correspondingly reduced.

29. The method of controlling subterranean flow of contaminants draining from a zone of contaminant concentration, that includes (a) determining the locus of flow of contaminants in a porous underground formation,
(b) drilling boreholes in the underground formation at selected locations about said zone of contaminant concentration,
(c) setting casing in the boreholes and sementing the casing in place,
(d) there being through openings formed sidewardly through the casings at selected elevations in the boreholes, and in relation to said locus of contaminant flow,
(e) injecting into the formation via said through openings a substance that creates a barrier in the formation to said flow, to thereby establish a controlled height barrier to block said flow,
(f) said (a) step including drilling at least one test hole in the formation to said region or regions and testing via said test hole or holes the compostion of the formation in a region or regions toward which contaminant flow is suspected,
(g) and locating said boreholes containing said casing further from said zone than said test hole and drilling the boreholes depper than contamination in the test hole,
(h) and including the step of employing projectiles to penetrate the formation via said through openings, and to form elongated shot holes in the formation via which said substance is injected into the formation.

* * * * *